(12) United States Patent
Li et al.

(10) Patent No.: US 11,165,894 B2
(45) Date of Patent: Nov. 2, 2021

(54) HOUSING ASSEMBLY AND TERMINAL

(71) Applicant: Huawei Technologies Co., Ltd., Shenzhen (CN)

(72) Inventors: Shizhe Li, Shanghai (CN); Hanwen Lu, Shanghai (CN); Xiaotao Dai, Shanghai (CN); Youying Lan, Shanghai (CN); Tong Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/054,389

(22) PCT Filed: May 11, 2018

(86) PCT No.: PCT/CN2018/086584
§ 371 (c)(1),
(2) Date: Nov. 10, 2020

(87) PCT Pub. No.: WO2019/213956
PCT Pub. Date: Nov. 14, 2019

(65) Prior Publication Data
US 2021/0234948 A1 Jul. 29, 2021

(51) Int. Cl.
*H04M 1/02* (2006.01)

(52) U.S. Cl.
CPC ................. *H04M 1/0249* (2013.01)

(58) Field of Classification Search
CPC .. H04M 1/0249; H04M 1/026; H04M 1/0254; H04M 1/035
See application file for complete search history.

(56) References Cited

U.S. PATENT DOCUMENTS

| | | | | |
|---|---|---|---|---|
| 2014/0294217 | A1* | 10/2014 | Yamaguchi | H04M 1/035 381/334 |
| 2015/0289042 | A1* | 10/2015 | Yamaguchi | H04R 1/025 381/87 |
| 2018/0198901 | A1* | 7/2018 | Kubo | G01K 13/00 |
| 2019/0072903 | A1* | 3/2019 | Park | H05K 5/061 |
| 2019/0098121 | A1* | 3/2019 | Jeon | H04B 1/38 |
| 2020/0329289 | A1* | 10/2020 | Kenaley | H04R 1/02 |

* cited by examiner

Primary Examiner — Md K Talukder
(74) Attorney, Agent, or Firm — Slater Matsil, LLP

(57) ABSTRACT

This application discloses a housing assembly, including a housing, a decorating part, and an adhesive assembly. The housing is provided with a through hole. The decorating part includes a substrate and a decorating ring protruding from the substrate. An air hole is disposed on the substrate. The air hole is located on an outer side of the decorating ring. The decorating ring is at least partially accommodated in the through hole. A gap is formed between an outer peripheral side surface of the decorating ring and a hole wall of the through hole. The adhesive assembly is attached between the substrate and the housing in a sealed manner. The adhesive assembly is disposed around the decorating ring and the air hole, and a channel is formed between the adhesive assembly and the outer peripheral side surface of the decorating ring.

20 Claims, 16 Drawing Sheets

HOUSING ASSEMBLY AND TERMINAL

CROSS-REFERENCE TO RELATED APPLICATIONS

This application is a national stage of International Application No. PCT/CN2018/086584, filed on May 11, 2018, which is hereby incorporated by reference in its entirety.

TECHNICAL FIELD

This application relates to the field of electronic products, and in particular, to a housing assembly and a terminal that applies the housing assembly.

BACKGROUND

With increasing waterproof levels of terminal products such as mobile phones and tablets, air tightness of integrated terminals becomes better. When a rear cover or front cover of a terminal is deformed by force, air pressure inside the integrated terminal changes and becomes different from that outside the integrated terminal. This causes air pressure imbalance inside and outside a single audio part (such as an earpiece or a loudspeaker). As a result, the audio part easily causes noise issues due to vibrating membrane deviation.

SUMMARY

This application provides a housing assembly and a terminal that can rapidly balance internal and external air pressure.

According to a first aspect, this application provides a housing assembly. The housing assembly may be applied to a terminal. The housing assembly includes a housing, a decorating part, and an adhesive assembly. The housing may be a rear cover of the terminal. The terminal further includes a bezel and a front cover. The front cover includes a cover slab and a screen fastened to the cover slab. The front cover and the housing are fastened to opposite sides of the bezel, to jointly enclose an overall inner cavity of the terminal. The overall inner cavity accommodates an audio part. A rear cavity of the audio part communicates with the overall inner cavity. A sound hole is disposed on the bezel. A front cavity of the audio part communicates with the sound hole. The audio part sends a sound to or receives a sound from the outside of the terminal through the sound hole. The audio part includes but is not limited to a loudspeaker (also referred to as a speaker) and an earpiece (also referred to as a receiver).

The housing is provided with a through hole. The through hole extends from an inner side of the housing to an outer side of the housing. The decorating part includes a substrate and a decorating ring protruding from the substrate. An air hole is disposed on the substrate. The air hole runs through the substrate. The air hole is located on an outer side of the decorating ring. The substrate is located on the inner side of the housing. The air hole communicates with the overall inner cavity. The decorating ring is at least partially accommodated in the through hole. That is, the decorating ring may be totally or partially accommodated in the through hole. This application provides a description by using an example in which the decorating ring is partially accommodated in the through hole. A gap is formed between an outer peripheral side surface of the decorating ring and a hole wall of the through hole. The adhesive assembly is attached between the substrate and the housing in a sealed manner. The adhesive assembly is disposed around the decorating ring and the air hole, and a channel is formed between the adhesive assembly and the outer peripheral side surface of the decorating ring. The channel communicates with the gap and the air hole. Since the adhesive assembly is attached to the substrate and the housing in the sealed manner, a gas flows in the following path: the outside of the terminal, the gap, the channel, the air hole, the waterproof breathable film, and the overall inner cavity, and is not leaked to the overall inner cavity from between the substrate and the housing by passing through the adhesive assembly.

When the front cover or the housing of the terminal is pressed, space in the overall inner cavity decreases and air pressure in the overall inner cavity increases. After an air flow enters the channel through the air hole, the air flow flows from the gap to the outside of the terminal, so that the air pressure in the overall inner cavity decreases to the same as that outside the terminal. When the pressing action is withdrawn, the space in the overall inner cavity increases, the air pressure in the overall inner cavity decreases, and an air flow flows into the overall inner cavity through the gap, the channel, and the air hole, so that the air pressure in the overall inner cavity increases to the same as that outside the terminal.

In this application, the housing assembly connects space on the inner and outer sides of the housing by using the gap, the channel, and the air hole, to rapidly balance the internal and external air pressure of the housing assembly. When the housing assembly is applied to the terminal, the terminal rapidly balances the air pressure in the overall inner cavity with that outside the terminal by using the gap, the channel, and the air hole. In this way, air pressure in the front cavity and that in the rear cavity of the audio part accommodated in the inner cavity of the terminal are rapidly balanced or maintained in balance, and the audio part can work properly.

The terminal further includes a camera module, and the camera module is accommodated in the overall inner cavity. The decorating ring may be a decorating ring of the camera module. A light transmission hole is formed on an inner side of the decorating ring. A light incident surface of the camera module directly faces the light transmission hole to receive light that passes through the light transmission hole. The terminal further includes a transparent cover slab. The transparent cover slab covers the light transmission hole. In another implementation, the terminal further includes a camera flash. The decorating ring may alternatively be a decorating ring of the camera flash.

In an implementation, the channel continuously surrounds an outer periphery of the decorating ring. When assembly precision implemented between the decorating ring and the housing is sufficient, the gap continuously surrounds the outer periphery of the decorating ring, and an air flow can pass through the gap from every direction of the decorating ring. When the assembly precision implemented between the decorating ring and the housing is insufficient, and a zero match (that is, mutual contact) is formed between a part of the outer peripheral side surface of the decorating ring and a part of the hole wall of the through hole, a gap corresponding to a zero-match area disappears, and an air flow can flow along the channel to a gap corresponding to a peripheral area of the zero-match area, so as to pass through the gap. Therefore, in this implementation, when the channel continuously surrounds the outer periphery of the decorating ring, air flow blocking caused by blocking some areas of the gap can be avoided. This ensures that the housing assembly can still rapidly balance the internal and external air pressure when the assembly precision is insufficient.

In an implementation, the adhesive assembly includes a first adhesive layer and a second adhesive layer. The first adhesive layer and the second adhesive layer are disposed by stacking. The first adhesive layer is attached to the substrate. The first adhesive layer is disposed around the decorating ring and the air hole. A first gap is formed between the first adhesive layer and the outer peripheral side surface of the decorating ring. The second adhesive layer is attached to the first adhesive layer and the housing in the sealed manner. A projection of the second adhesive layer on the substrate totally falls within a range of a projection of the first adhesive layer on the substrate. In this case, no gas or liquid is leaked to the overall inner cavity from between the first adhesive layer and the housing by passing through the second adhesive layer. A second gap is formed between the second adhesive layer and the outer peripheral side surface of the decorating ring. Both the second gap and the first gap are parts of the channel.

In this implementation, because both the second gap and the first gap are the parts of the channel, a required shape of the channel may be formed by arranging shapes of the second gap and the first gap, thereby meeting an air flow circulation requirement of the housing assembly during balancing of the internal and external air pressure. For example, the first adhesive layer is provided with a relatively large overall width, an inner peripheral side surface of the first adhesive layer is disposed close to the outer peripheral side surface of the decorating ring, and the first gap disposed around the outer periphery of the decorating ring has a relatively small width. A shape of the second adhesive layer is different from that of the first adhesive layer. The second adhesive layer has a relatively small width. Some areas on an inner peripheral side surface of the second adhesive layer are farther away from the outer peripheral side surface of the decorating ring than the first adhesive layer. In this way, some areas of the second gap have relatively large widths, thereby increasing a circulation area of the channel.

It can be understood that, because the first adhesive layer has a relatively large overall width, an area of attachment between the first adhesive layer and the substrate is large, so that the attachment between the first adhesive layer and the substrate is more secure, and the first adhesive layer has relatively good waterproof performance, thereby improving overall waterproof performance of the housing assembly.

In an implementation, the adhesive assembly further includes a soft support part. The soft support part is disposed in the second gap. The soft support part is fastened to the first adhesive layer. The adhesive assembly forms a sandwiched structure, and includes a stacking structure with two layers. One layer is the first adhesive layer. On the other layer, the second adhesive layer serves as a periphery, and the soft support part is in the middle. Disposing the soft support part makes the sandwiched structure have relatively high overall support strength. When a force is applied to the housing or the substrate, the adhesive assembly can play good buffer and support functions.

A third gap is formed between the soft support part and the outer peripheral side surface of the decorating ring. A projection of the third gap on the substrate covers a projection of the first gap on the substrate. A fourth gap is formed between the soft support part and the inner peripheral side surface of the second adhesive layer. Both the fourth gap and the third gap are parts of the second gap and communicate with each other. In this case, the soft support part can provide a support function. In addition, the third gap between the soft support part and the outer peripheral side surface of the decorating ring and the fourth gap between the soft support part and the inner peripheral side surface of the second adhesive layer are parts of the channel. In this way, the channel has a sufficient circulation area, to ensure that the housing assembly can rapidly balance the internal and external pressure.

There are a plurality of such soft support parts. Shapes of the plurality of soft support parts may be the same or different. The plurality of soft support parts are arranged in the second gap in a scattered manner. Replacing a conventional surface-based support manner of the second adhesive layer with a point-based support manner of the soft support part enables a relatively large circulation area of the second gap. The soft support parts are mainly arranged at positions with relatively large widths in the second gap, so that the adhesive assembly implements a more comprehensive and balanced support function.

In an implementation, a thickness of the soft support part is the same as a thickness of the second adhesive layer, so that the adhesive assembly implements a more stable support function.

In an implementation, the adhesive assembly includes an integrally formed adhesive ring, and the adhesive ring is disposed around the decorating ring and the air hole. A difference between this implementation and the foregoing implementations lies in the following: In this implementation, the adhesive assembly is provided with the integrally formed adhesive ring instead of using a multi-layer stacking structure. This simplifies a structure of the adhesive assembly, making the housing assembly have relatively low costs and a relatively simple assembly process.

In an implementation, the adhesive assembly further includes a soft support block. The soft support block is disposed between the adhesive ring and the decorating ring. A fifth gap is formed between the soft support block and the adhesive ring. A sixth gap is formed between the soft support part and the outer peripheral side surface of the decorating ring. Both the fifth gap and the sixth gap are parts of the channel.

In this implementation, a gap between the adhesive ring and the outer peripheral side surface of the decorating ring has a relatively large width, so that circulation space of the channel is relatively large. The adhesive assembly has the soft support block disposed in the gap. In this way, the adhesive assembly can have relatively reliable support performance. In addition, the fifth gap and the sixth gap enable relatively large circulation space of the channel, to meet the air flow circulation requirement of the housing assembly.

Certainly, in another implementation, the adhesive assembly may not be provided with the soft support block, and an inner peripheral side surface of the adhesive ring is disposed close to the decorating ring, thereby meeting a support performance requirement of the adhesive assembly.

In an implementation, the decorating ring has a groove. The groove is disposed in a circumferential direction of the decorating ring. The groove is recessed from the outer peripheral side surface of the decorating ring towards an interior of the decorating ring. The groove communicates with the gap and the channel.

In this implementation, the groove is disposed in the decorating ring, and communicates with the gap and the channel. Therefore, disposing the groove increases an area and a through-flow capability at an opening position of the groove, and improves an air exchange rate between inner and outer sides of the housing assembly. In addition, because the groove uses space of the decorating ring, when sufficient circulation space is ensured for the channel, the adhesive assembly may be disposed relatively close to the decorating ring, so that the adhesive assembly and the decorating ring are assembled in a relatively compact manner, reducing an overall volume.

The decorating ring includes a root part close to the substrate and an end part far away from the substrate. The groove is disposed close to the root part of the decorating ring. An area, of the gap, that is close to the end part of the decorating ring has a relatively small width. When the decorating ring is assembled to the housing, the decorating ring does not obviously deviate from the hole wall of the through hole, so that the assembly precision implemented between the decorating ring and the housing is relatively high. An area, of the gap, that is close to the root part of the decorating ring communicates with the groove. An air flow can flow rapidly along the groove, and flow in or out in every direction of the gap. When the assembly precision implemented between the decorating ring and the housing is insufficient, and a zero match (that is, mutual contact) is formed between a part of the outer peripheral side surface of the decorating ring and a part of the hole wall of the through hole, a gap corresponding to a zero-match area disappears, and an air flow can also flow along the groove to a gap corresponding to a peripheral area of the zero-match area, so as to pass through the gap. Therefore, in this implementation, when the groove is disposed in the circumferential direction of the decorating ring, the groove can cooperate with the channel to better avoid air flow blocking caused by blocking some areas of the gap. This ensures that the housing assembly can still rapidly balance the internal and external air pressure when the assembly precision is insufficient.

In an implementation, the decorating ring further has a stiffener, and the stiffener is disposed in the groove. The stiffener can increase structural strength of the decorating ring and reduce a deformation risk of the decorating ring. An extension direction of the stiffener may be approximately perpendicular to the substrate. When the decorating ring is at least partially accommodated in the through hole, the extension direction of the stiffener is approximately parallel to an axial direction of the through hole, and the stiffener can assist the decorating ring in better supporting a pressing force that is approximately perpendicular to the housing.

In an implementation, the housing assembly further includes a waterproof breathable film. The waterproof breathable film can allow a gas to pass through and block a liquid. There are at least two such air holes. The at least two air holes are spaced from each other, to provide a plurality of inlets and outlets between the channel and the overall inner cavity. The substrate has a support bar formed between adjacent air holes, and the support bar can increase overall strength of the substrate. The waterproof breathable film covers the at least two air holes. In this implementation, the waterproof breathable film covers all the air holes. This can simplify an assembling process of the housing assembly and reduce costs of the housing assembly.

In an implementation, there are at least two such decorating rings. The at least two decorating rings are spaced from each other. The channel is disposed around each of the decorating rings. The gap formed between each of the decorating rings and the hole wall of the through hole communicates with the channel.

In this implementation, because the channel communicates with the gaps corresponding to the at least two decorating rings, an air flow can enter into and exit from the housing through at least one of the gaps corresponding to the at least two decorating rings. The channel has at least two such gaps communicating with the outside of the terminal, and the housing assembly forms a multi-path air exchange system, thereby improving the air exchange rate between the inner and outer sides of the housing assembly, and enabling the housing assembly to rapidly balance the internal and external air pressure.

In addition, because the channel has at least two such gaps, and the at least two gaps may be used as water discharge openings, sealing malfunction due to long-term water storage in the channel can be prevented.

According to a second aspect, this application provides a terminal, including an audio part and the foregoing housing assembly. The audio part is located on the inner side of the housing, and a rear cavity of the audio part communicates with the air hole. The terminal in this application may be any device that has communications and storage functions, for example, a tablet computer, a mobile phone, an e-reader, a remote control, a personal computer, a notebook computer, an in-vehicle device, a network television, a wearable device, or another intelligent device with a network function.

Because the housing assembly can rapidly balance internal and external air pressure, the terminal that applies the housing assembly can rapidly balance air pressure in the overall inner cavity with that outside the terminal, so that the audio part accommodated in the overall inner cavity works properly.

DETAILED DESCRIPTION OF ILLUSTRATIVE EMBODIMENTS

The following describes the embodiments of this application with reference to the accompanying drawings in the embodiments of this application.

Figure 1:
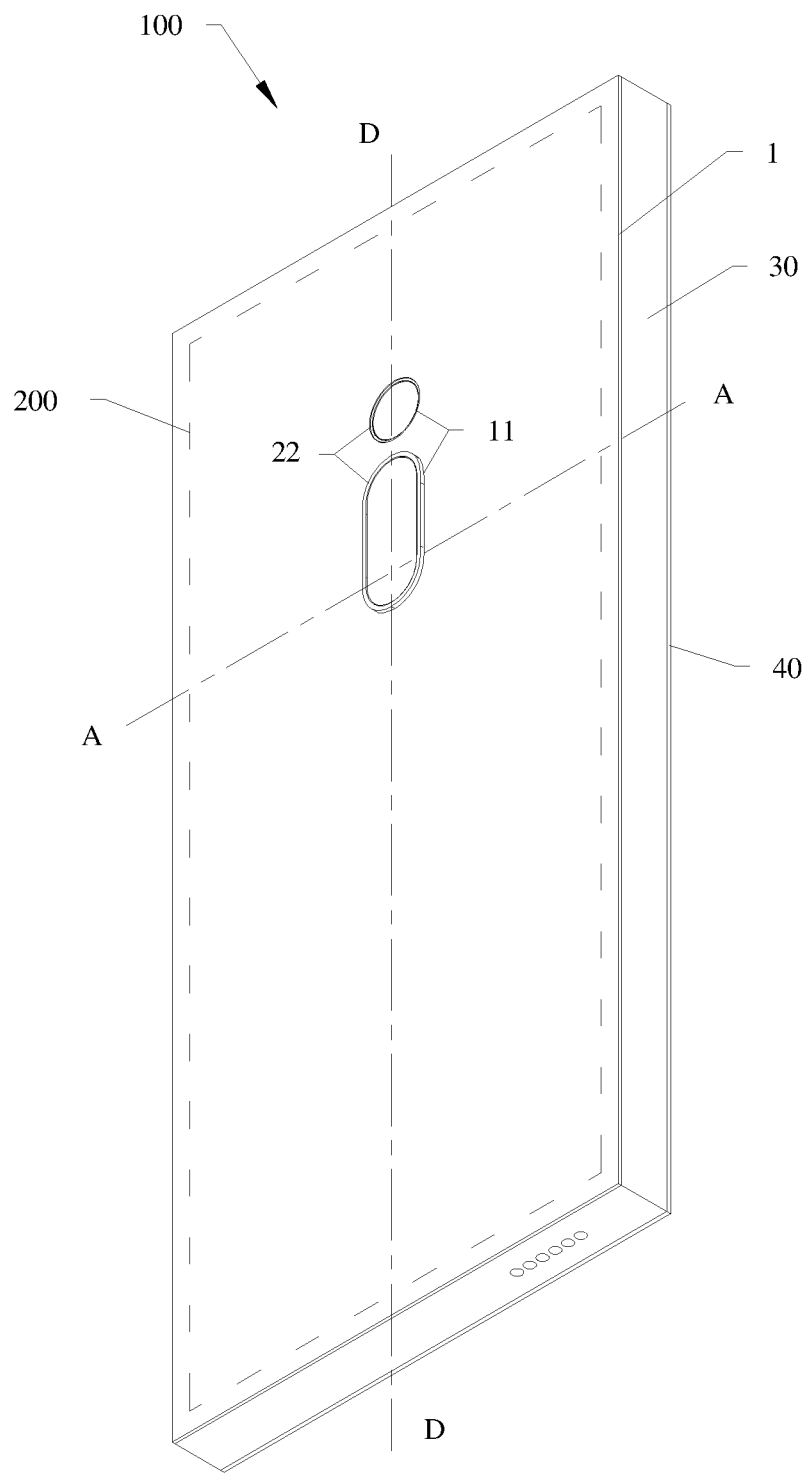
FIG. 1 is a schematic structural diagram of a terminal according to an implementation of this application.

FIG. 1 is a schematic structural diagram of a terminal 100 according to an implementation of this application The terminal 100 in the implementation of this application may be any device that has communications and storage functions, for example, a tablet computer, a mobile phone, an e-reader, a remote control, a personal computer (personal computer, PC), a notebook computer, an in-vehicle device, a network television, a wearable device, or an intelligent device with a network function. The implementation of this application is described by using an example in which the terminal 100 is a mobile phone. The terminal 100 includes a housing 1, a bezel 30, and a front cover 40. The housing 1 may be a rear cover of the terminal 100. The front cover 40 and the housing 1 are fastened to opposite sides of the bezel 30, to jointly enclose an overall inner cavity 200 of the terminal 100. An inner side of the housing 1 faces the overall inner cavity 200. An outer side of the housing 1 faces away from the overall inner cavity 200. The housing 1 may be a glass or metal rear cover. The bezel 30 may be a metal or plastic bezel. When the housing 1 is a metal rear cover and the bezel is a metal bezel, the housing 1 may be integrally formed with the bezel 30.

Figure 2:
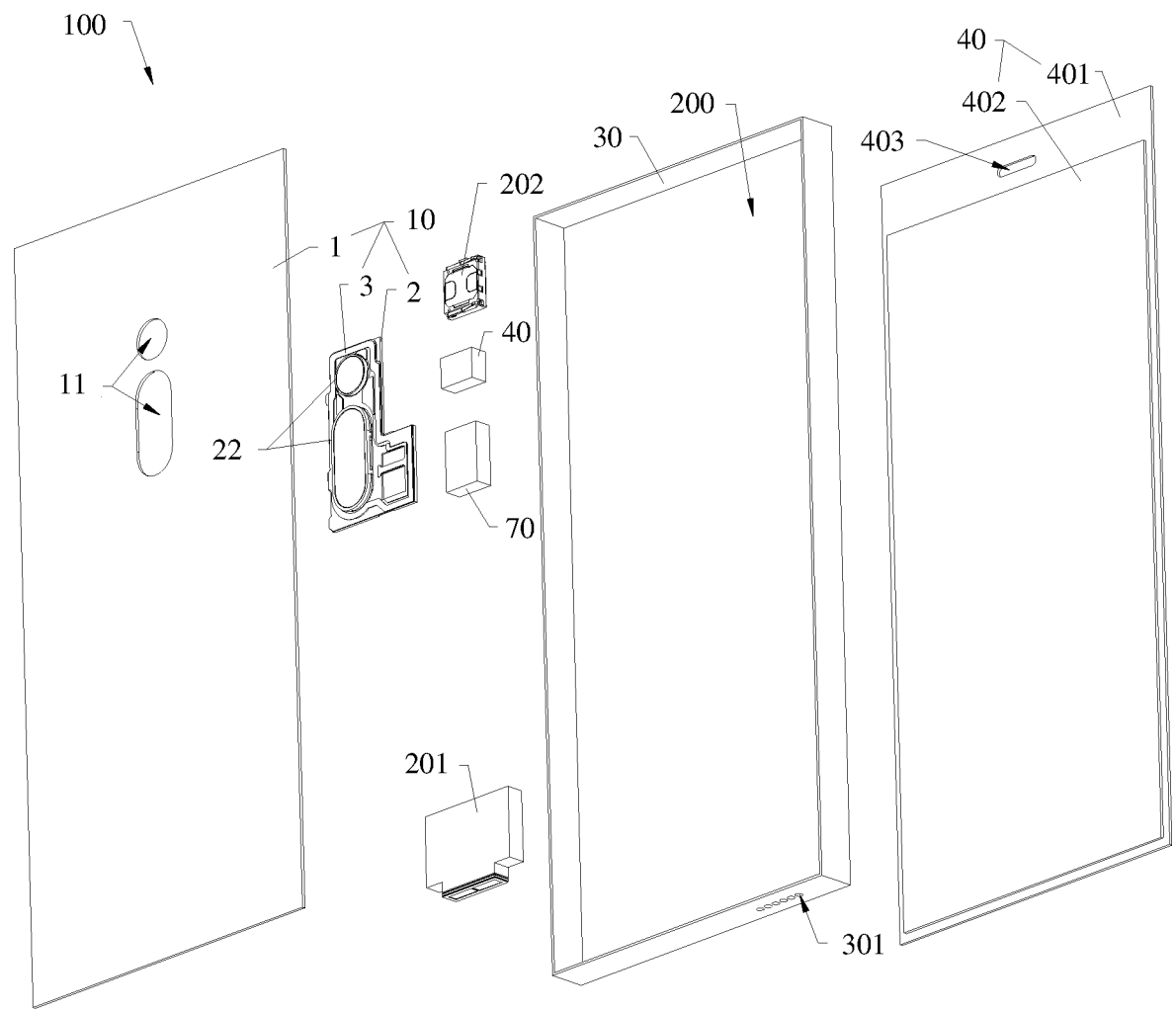
FIG. 2 is a schematic exploded view of the terminal shown in FIG. 1.

FIG. 2 is a schematic exploded view of the terminal 100 shown in FIG. 1.

The terminal 100 further includes a decorating part 2 and an adhesive assembly 3. The housing 1, the decorating part 2, and the adhesive assembly 3 form a housing assembly 10. The housing 1 is provided with a through hole 11. The through hole 11 extends from the inner side of the housing 1 towards the outer side of the housing 1. There are two through holes 11, which are spaced from each other. The decorating part 2 and the adhesive assembly 3 are disposed in the overall inner cavity 200. The adhesive assembly 3 is configured to fasten the decorating part 2 to the inner side of the housing 1. The decorating part 2 includes two decorating rings 22 spaced from each other. When the decorating part 2 is fastened to the housing 1, the two decorating rings 22 are exposed to the outer side of the housing 1 through the two through holes 11 (shown in FIG. 1). In this case, both decorating rings 22 are at least partially accommodated in the corresponding through holes 11. That is, the decorating rings 22 may be totally or partially accommodated in the through holes 11. This application is described by using an example in which the decorating rings 22 are partially accommodated in the through holes 11.

During assembling of the terminal 100, the housing assembly 10 may be first assembled into an integrated module, and then may be fastened to the bezel 30, so as to be assembled into the terminal 100. The modular housing assembly 10 can simplify an assembling procedure of the terminal 100 and reduce assembling difficulty.

The terminal 100 further includes a camera module 70 and a camera flash 40. The camera module 70 may be a single-camera module, a dual-camera module, or a multi-camera module (including three or more cameras). The camera module 70 is accommodated in the overall inner cavity 200 and is disposed by directly facing inner side space of one of the decorating rings 22. The camera flash 40 is accommodated in the overall inner cavity 200 and is disposed by directly facing inner side space of the other decorating ring 22.

The two decorating rings 22 may have different heights, and a height of the decorating ring 22 directly facing the camera module 70 is greater than that of the decorating ring 22 directly facing the camera flash 40. The decorating ring 22 directly facing the camera module 70 may partially protrude from the housing 1.

In another implementation, the camera flash 40 may alternatively be replaced with another module, for example, another camera module or a fingerprint recognition module. Alternatively, there may be one or three or more decorating rings 22. A quantity of through holes 11 is the same as a quantity of decorating rings 22. In this application, the quantity of decorating rings 22 and module types corresponding to the decorating rings 22 may be configured based on a specific requirement. The plurality of decorating rings 22 may alternatively include a decorating ring that is not used to decorate another module.

Referring to FIG. 2, the terminal 100 further includes an audio part. The audio part includes but is not limited to a loudspeaker (also referred to as a speaker) 201 and an earpiece (also referred to as a receiver) 202. The audio part (201/202) is located on the inner side of the housing 1, that is, accommodated in the overall inner cavity 200.

A sound hole 301 is disposed on the bezel 30. A front cavity of the loudspeaker 201 communicates with the sound hole 301, and the loudspeaker 201 sends a sound to the outside of the terminal 100 through the sound hole 301. A rear cavity of the loudspeaker 201 communicates with the overall inner cavity 200.

The front cover 40 includes a cover slab 401 and a screen 402 fastened to the cover slab 401. The cover slab 401 may be a glass cover slab, and can transmit light. The screen 402 is configured to implement display and touch functions. A sound hole 403 is disposed on the cover slab 401. A front cavity of the earpiece 202 communicates with the sound hole 403, and the earpiece 202 sends a sound to the outside of the terminal 100 through the sound hole 403. A rear cavity of the earpiece 202 communicates with the overall inner cavity 200.

In short, a front cavity of the audio part (201/202) communicates with the outside of the terminal 100, and a rear cavity thereof communicates with the overall inner cavity 200.

Figure 3:
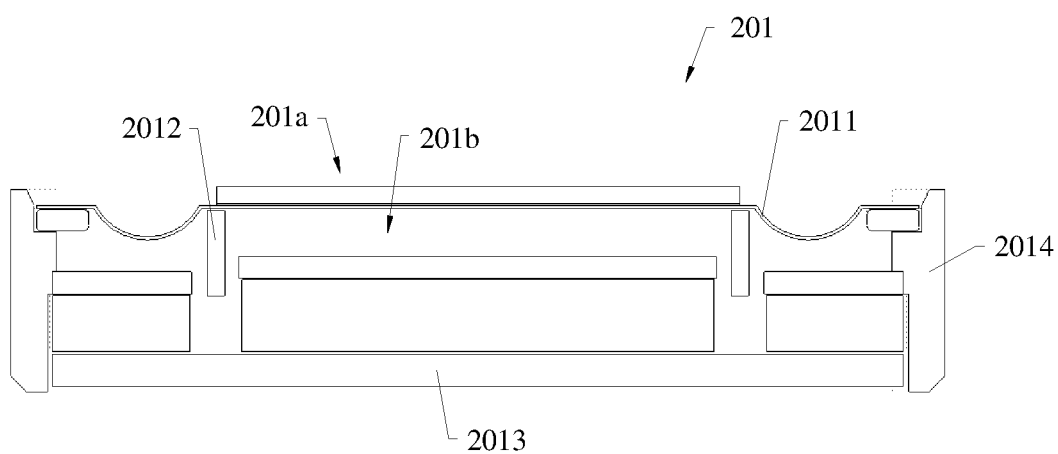
FIG. 3 is a schematic structural diagram of a loudspeaker according to an implementation of this application.

FIG. 3 is a schematic structural diagram of a loudspeaker 201 according to an implementation of this application. The loudspeaker 201 includes a vibrating membrane 2011, a voice coil 2012, a magnetic circuit structure 2013, and a support 2014. The magnetic circuit structure 2013 and the vibrating membrane 2011 are fastened to opposite sides of the support 2014. A rear cavity 201b is formed on a side, of the vibrating membrane 2011, that faces the magnetic circuit structure 2013, and the rear cavity 201b communicates with the overall inner cavity. A front cavity 201a is formed on a side, of the vibrating membrane 2012, that faces away from the magnetic circuit structure 2013, and the front cavity 201a communicates with the outside of the terminal. Pressure in the front cavity 201a and the rear cavity 201b affects a position of the vibrating membrane 2012. The voice coil 2012 is fastened to the side of the vibrating membrane 2011 that faces the magnetic circuit structure 2013.

A conventional terminal has high air tightness. For example, when a terminal with an IPX7 waterproof level or higher is pressed or a pressing action on this terminal is withdrawn and air pressure in an overall inner cavity of the terminal changes, it is difficult for the air pressure in the overall inner cavity to be balanced with that outside the terminal. When the terminal is pressed, the air pressure in the overall inner cavity is greater than that outside the terminal. As a result, the vibrating membrane 2011 of the loudspeaker 201 inside the terminal shifts upward. When the pressing action is withdrawn, the air pressure in the overall inner cavity is less than that outside the terminal. As a result, the vibrating membrane 2011 of the loudspeaker 201 shifts downward. When the vibrating membrane of the loudspeaker 201 shifts upward, the voice coil 2012 of the loudspeaker 201 exceeds an area with maximum magnetic field strength. Therefore, an amplitude of the vibrating membrane 2011 decreases, and a volume of the loudspeaker 201 decreases. When the vibrating membrane 2011 of the loudspeaker 201 shifts downward, although the voice coil 2012 of the loudspeaker 201 is still in the area with the maximum magnetic field strength and the volume of the loudspeaker 201 remains unchanged, the voice coil 2012 easily reaches the magnetic circuit structure 2013 of the loudspeaker 201 due to a decrease in space for downward vibration of the voice coil 2012 of the loudspeaker 201, resulting in noise of the loudspeaker 201. In short, it is difficult for the conventional terminal to obtain balance between internal and external air pressure of the terminal. Therefore, imbalance easily occurs between the air pressure in the front cavity 201a and that in the rear cavity 201b of the loudspeaker 201 or another audio part, and the vibrating membrane shifts, causing malfunction.

Figure 4:
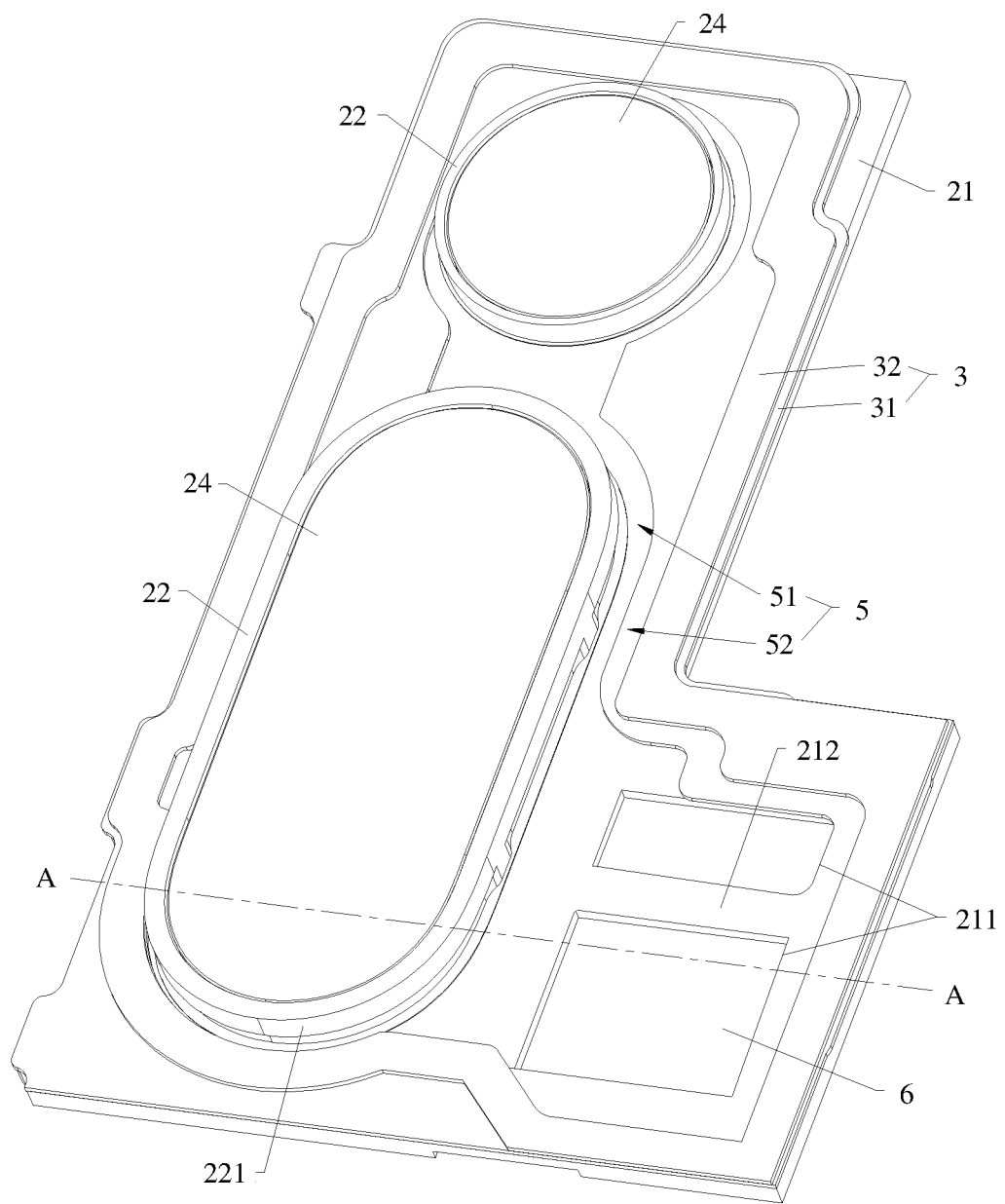
FIG. 4 is a schematic structural diagram of a partial structure of a housing assembly shown in FIG. 2 in an implementation.
Figure 5:
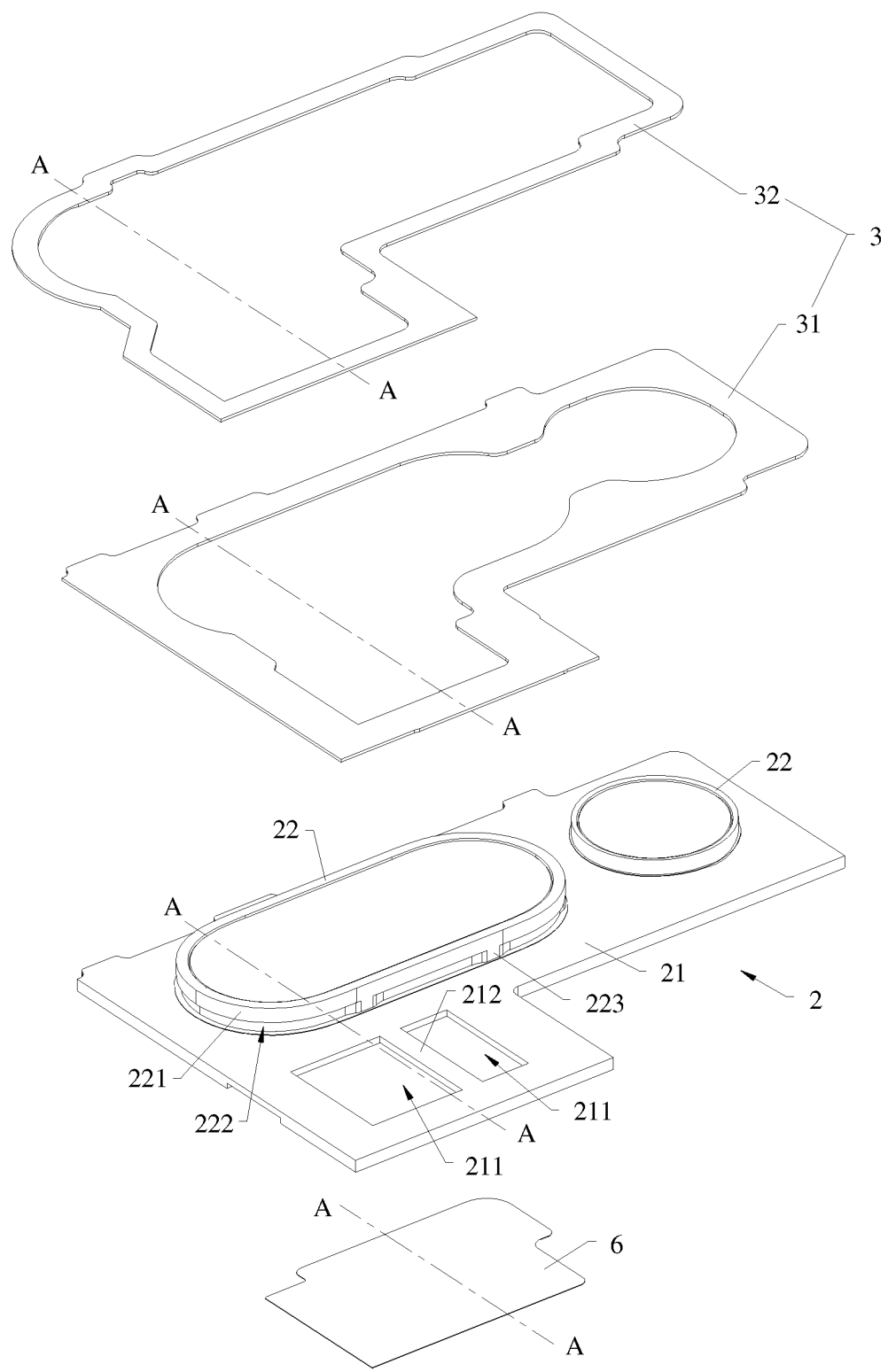
FIG. 5 is a schematic exploded view of the structure shown in FIG. 4.

FIG. 4 is a schematic structural diagram of a partial structure of a housing assembly shown in FIG. 2 in an implementation. FIG. 5 is a schematic exploded view of the structure shown in FIG. 4. FIG. 4 and FIG. 5 illustrate structures of the decorating part 2 and the adhesive assembly 3 in an implementation.

The decorating part 2 further includes a substrate 21. The decorating ring 22 protrudes from the substrate 21. An air hole 211 is disposed on the substrate 21. The air hole 211 runs through the substrate 21. The air hole 211 is located on an outer side of the decorating ring 22. Because the substrate 21 is accommodated in the overall inner cavity 200 (shown in FIG. 2), the air hole 211 communicates with the overall inner cavity 200. There are two air holes 211. The two air holes 211 are spaced from each other, to provide a plurality of inlets and outlets between a channel 5 and the overall inner cavity 200. The substrate 21 has a support bar 212 formed between adjacent air holes 211, and the support bar 212 can increase overall strength of the substrate 21. In another implementation, there may be one or at least two air holes 211. The decorating part 2 further includes a transparent cover slab 24. The transparent cover slab 24 is located on an inner side of the decorating ring 22.

The adhesive assembly 3 is disposed around the decorating ring 22 and the air hole 211, and the channel 5 is formed between the adhesive assembly 3 and an outer peripheral side surface 221 of the decorating ring 22. The channel 5 communicates with the air hole 211. The adhesive assembly 3 is disposed approximately around a periphery of the substrate 21. The adhesive assembly 3 is attached to the substrate 21. A surface, of the adhesive assembly 3, that faces away from the substrate 21 is further configured to attach to the housing 1 (shown in FIG. 2). The adhesive assembly 3 is attached between the substrate 21 and the housing 1 in a sealed manner. In this case, no gas or liquid is leaked to the overall inner cavity 200 from between the substrate 21 and the housing 1 by passing through the adhesive assembly 3.

The adhesive assembly 3 includes a first adhesive layer 31 and a second adhesive layer 32. The first adhesive layer 31 and the second adhesive layer 32 are disposed by stacking.

The first adhesive layer 31 is attached to the substrate 21. The first adhesive layer 31 is disposed around the decorating ring 22 and the air hole 211. A first gap 51 is formed between the first adhesive layer 31 and the outer peripheral side surface 221 of the decorating ring 22. The second adhesive layer 32 is attached to a side, of the first adhesive layer 31, that faces away from the substrate 21. A projection of the second adhesive layer 32 on the substrate 21 may totally fall within a range of a projection of the first adhesive layer 31 on the substrate 21. The second adhesive layer 32 is further configured to attach to the housing 1 (shown in FIG. 2). The second adhesive layer 32 is attached to the first adhesive layer 31 and the housing 1 in the sealed manner. In this case, no gas or liquid is leaked to the overall inner cavity 200 from between the first adhesive layer 31 and the housing 1 by passing through the second adhesive layer 32. A second gap 52 is formed between the second adhesive layer 32 and the outer peripheral side surface 221 of the decorating ring 22. Both the second gap 52 and the first gap 51 are parts of the channel 5.

Referring to FIG. 4 and FIG. 5, the housing assembly 10 further includes a waterproof breathable film 6. The waterproof breathable film 6 can allow a gas to pass through and block a liquid. The waterproof breathable film 6 covers the air hole 211. In this way, a gas can pass through the waterproof breathable film and flow between the air hole 211 and the overall inner cavity 200, but a liquid is blocked by the waterproof breathable film 6 and no external liquid enters the overall inner cavity 200 through the air hole 211. The waterproof breathable film 6 covers all the air holes 211. This can simplify an assembling process of the housing assembly 10 and reduce costs of the housing assembly 10. In another implementation, there may alternatively be a plurality of waterproof breathable films 6, which cover different air holes 211.

Figure 6:
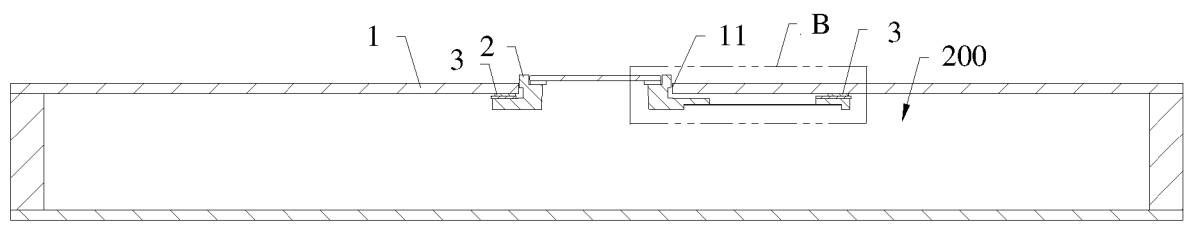
FIG. 6 is a schematic structural diagram of a partial structure along a line A-A of the terminal shown in FIG. 1 in an implementation.

FIG. 6 is a schematic structural diagram of a partial structure along a line A-A of the terminal shown in FIG. 1 in an implementation. The line A-A is illustrated at corresponding positions in both the structures in FIG. 4 and FIG. 5. The overall inner cavity 200 is formed in the terminal 100. The decorating part 2 is fastened to the inner side of the housing 1 by using the adhesive assembly 3. The decorating part 2 is partially accommodated in the overall inner cavity 200 and partially accommodated in the through hole 11.

Figure 7:
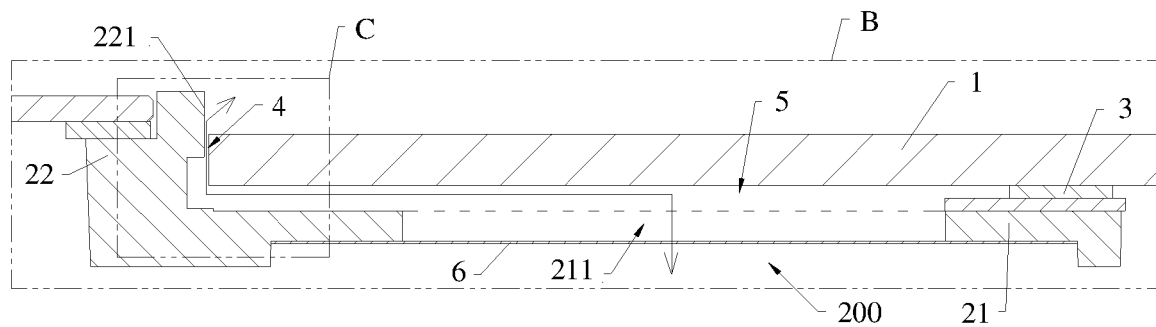
FIG. 7 is an enlarged schematic diagram of a structure at B in FIG. 6.
Figure 8:
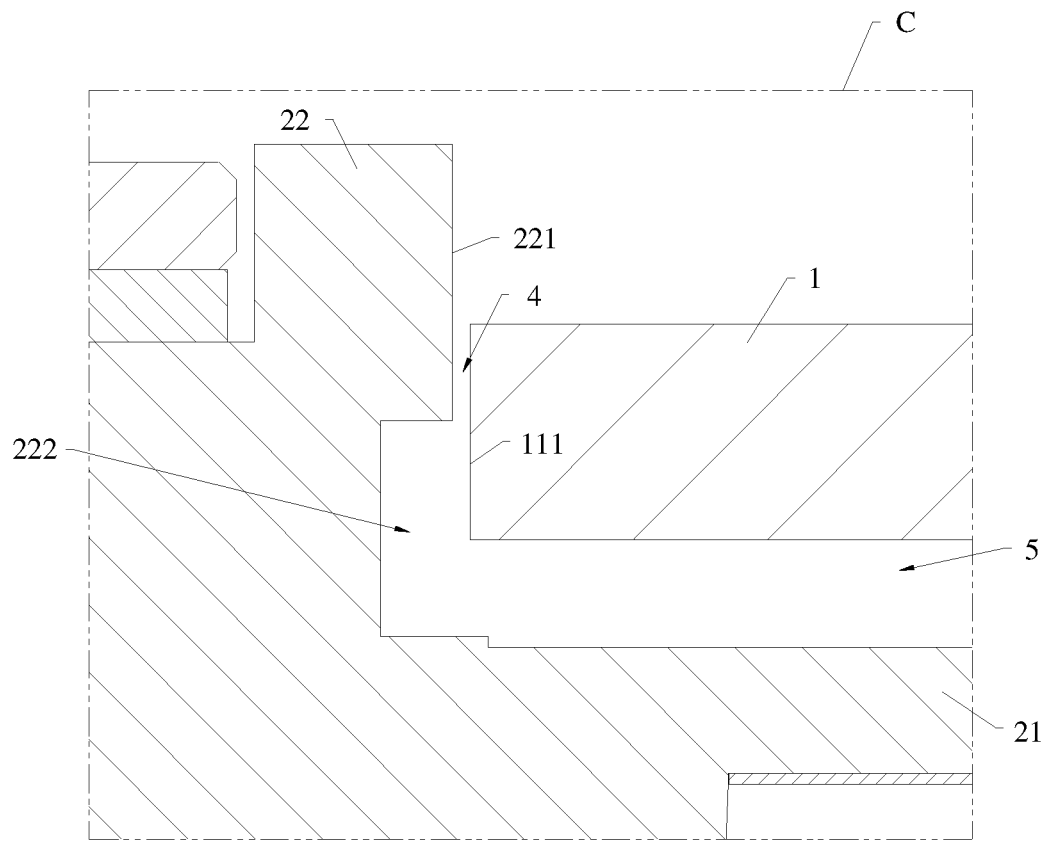
FIG. 8 is an enlarged schematic diagram of a structure at C in FIG. 7.

FIG. 7 is an enlarged schematic diagram of a structure at B in FIG. 6, and FIG. 8 is an enlarged schematic diagram of a structure at C in FIG. 7. The substrate 21 of the decorating part 2 is located on the inner side of the housing 1. The air hole 211 of the substrate 21 communicates with the overall inner cavity 200. The decorating ring 22 is at least partially accommodated in the through hole 11. The substrate 21 is fastened to the inner side of the housing 1 by using the adhesive assembly 3. The decorating ring 22 of the decorating part 2 is formed integrally with the substrate 21. A gap 4 is formed between the outer peripheral side surface 221 of the decorating ring 22 and a hole wall 11 of the through hole 11. The channel 5 is formed between the adhesive assembly 3 and the outer peripheral side surface 221 of the decorating ring 22. The channel 5 communicates with the gap 4 and the air hole 211.

In this implementation, a gas flows in the following path: the outside of the terminal 100, the gap 4, the channel 5, the air hole 211, the waterproof breathable film 6, and the overall inner cavity 200. A liquid is blocked by the waterproof breathable film 6, and flows in the following path: the outside of the terminal 100, the gap 4, the channel 5, the air hole 211, and the waterproof breathable film 6.

When the front cover 40 or the housing 1 of the terminal 100 (shown in FIG. 1) is pressed, space in the overall inner cavity 200 decreases and air pressure in the overall inner cavity 200 increases. After an air flow enters the channel 5 through the air hole 211, the air flow flows from the gap 4 to the outside of the terminal 100, so that the air pressure in the overall inner cavity 200 decreases to the same as that outside the terminal 100. When the pressing action is withdrawn, the space in the overall inner cavity 200 increases, the air pressure in the overall inner cavity 200 decreases, and an air flow flows into the overall inner cavity 200 through the gap 4, the channel 5, and the air hole 211, so that the air pressure in the overall inner cavity 200 increases to the same as that outside the terminal 100.

In this application, the housing assembly 10 connects space on the inner and outer sides of the housing 1 by using the gap 4, the channel 5, and the air hole 211, to rapidly balance the internal and external air pressure of the housing assembly 10. When the housing assembly 10 is applied to the terminal 100, the terminal 100 rapidly balances the air pressure in the overall inner cavity 200 with that outside the terminal 100 by using the gap 4, the channel 5, and the air hole 211. In this way, the air pressure in the front cavity and that in the rear cavity of the audio part (201/202) accommodated in the inner cavity of the terminal 100 are rapidly balanced or maintained in balance, and the audio part (201/202) can work properly.

The terminal 100 may further include a barometer (not shown in the figure). The barometer is disposed in the overall inner cavity 200 of the terminal 100. The terminal 100 rapidly balances the internal and external air pressure by using the housing assembly 10. This can not only ensure normal operation of the audio part (201/202), but also help improve detection accuracy and stability of the barometer. Similarly, disposing the housing assembly 10 can make another air pressure-sensitive component disposed in the overall inner cavity 200 work normally.

Figure 9:
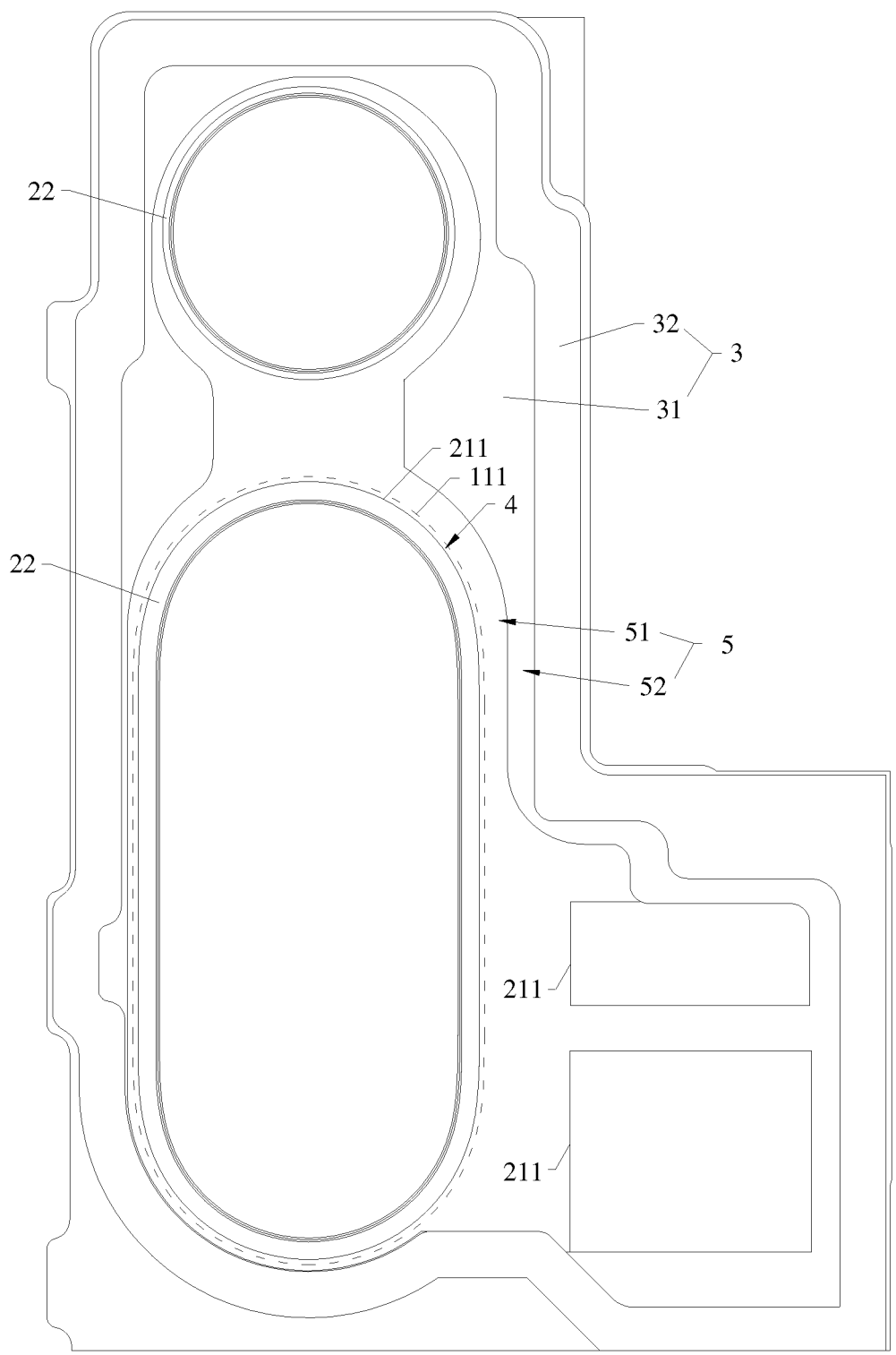
FIG. 9 is a top view of the structure shown in FIG. 4.

FIG. 9 is a top view of the structure shown in FIG. 4. FIG. 9 illustrates the hole wall 11 of the through hole 11 of the housing 1 by using a dashed line. The gap 4 is formed between the hole wall 11 and the outer peripheral side surface 221 of the decorating ring 22. The channel 5 is formed between the adhesive assembly 3 and the outer peripheral side surface 221 of the decorating ring 22. The channel 5 continuously surrounds an outer periphery of the decorating ring 22.

When assembly precision implemented between the decorating ring 22 and the housing 1 is sufficient, the gap 4 continuously surrounds the outer periphery of the decorating ring 22, and an air flow can pass through the gap 4 from every direction of the decorating ring 22. When the assembly precision implemented between the decorating ring 22 and the housing 1 is insufficient, and a zero match (that is, mutual contact) is formed between a part of the outer peripheral side surface of the decorating ring 22 and a part of the hole wall of the through hole 11, for example, the decorating ring 22 deviates during mounting and inclines towards or approaches one of sides of the through hole 11, a gap 4 corresponding to a zero-match area disappears, and an air flow can flow along the channel 5 to a gap 4 corresponding to a peripheral area of the zero-match area, so as to pass through the gap 4.

In this implementation, when the channel 5 continuously surrounds the outer periphery of the decorating ring 22, air flow blocking caused by blocking some areas of the gap 4 can be avoided. This ensures that the housing assembly 10 can still rapidly balance the internal and external air pressure when the assembly precision is insufficient.

Referring to FIG. 9, the first adhesive layer 31 is attached to the substrate 21. The first gap 51 is formed between the first adhesive layer 31 and the outer peripheral side surface 221 of the decorating ring 22. The first gap 51 is disposed around the decorating ring 22. The second adhesive layer 32 is attached to the side, of the first adhesive layer 31, that faces away from the substrate 21. The projection of the second adhesive layer 32 on the substrate 21 may totally fall within the range of the projection of the first adhesive layer 31 on the substrate 21. The second gap 52 is formed between the second adhesive layer 32 and the outer peripheral side surface 221 of the decorating ring 22. The second gap 52 is disposed around the decorating ring 22.

In this implementation, because both the second gap 52 and the first gap 51 are the parts of the channel 5, a required shape of the channel 5 may be formed by arranging shapes of the second gap 52 and the first gap 51, thereby meeting an air flow circulation requirement of the housing assembly 10 during balancing of the internal and external air pressure. For example, the first adhesive layer 31 is provided with a relatively large overall width, an inner peripheral side surface of the first adhesive layer 31 is disposed close to the outer peripheral side surface 221 of the decorating ring 22, and the first gap 51 disposed around the outer periphery of the decorating ring 22 has a relatively small width. A shape of the second adhesive layer 32 is different from that of the first adhesive layer 31. The second adhesive layer 32 has a relatively small width. Some areas on an inner peripheral side surface 321 of the second adhesive layer 32 are farther away from the outer peripheral side surface 221 of the decorating ring 22 than the first adhesive layer 31. In this way, some areas of the second gap 52 have relatively large widths, thereby increasing a circulation area of the channel 5.

It can be understood that, because the first adhesive layer 31 has a relatively large overall width, an area of attachment between the first adhesive layer 31 and the substrate 21 is large, so that the attachment between the first adhesive layer 31 and the substrate 21 is more secure, and the first adhesive layer 31 has relatively good waterproof performance, thereby improving overall waterproof performance of the housing assembly 10.

Referring to FIG. 5 and FIG. 8, the decorating ring 22 has a groove 222. The groove 222 is disposed in a circumferential direction of the decorating ring 22. The groove 222 is recessed from the outer peripheral side surface 221 of the decorating ring 22 towards an interior of the decorating ring 22. As shown in FIG. 8, the groove 222 communicates with the gap 4 and the channel 5.

In this implementation, the groove 222 is disposed in the decorating ring 22, and communicates with the gap 4 and the channel 5. Therefore, disposing the groove 222 increases an area and a through-flow capability at an opening position of the groove 222, and improves an air exchange rate between inner and outer sides of the housing assembly 10. In addition, because the groove 222 uses space of the decorating ring 22, when sufficient circulation space is ensured for the channel 5, a part of the adhesive assembly 3 that surrounds the decorating ring 22 may be disposed relatively close to the decorating ring 22, so that the adhesive assembly 3 and the decorating ring 22 are assembled in a relatively compact manner, reducing an overall volume.

The decorating ring 22 includes a root part close to the substrate 21 and an end part far away from the substrate 21. The groove 222 is disposed close to the root part of the decorating ring 22. As shown in FIG. 8, an area, of the gap 4, between the end part of the decorating ring 22 and the hole wall 11 of the through hole 11 has a relatively small width. When the decorating ring 22 is assembled to the housing 1, the decorating ring 22 does not obviously deviate from the hole wall 11 of the through hole 11, so that the assembly precision implemented between the decorating ring 22 and the housing 1 is relatively high. An area, of the gap 4, that is close to the root part of the decorating ring 22 communicates with the groove 222. An air flow can flow rapidly along the groove 222, and flow in or out in every direction of the gap 4. When the assembly precision implemented between the decorating ring 22 and the housing 1 is insufficient, and a zero match (that is, mutual contact) is formed between a part of the outer peripheral side surface of the decorating ring 22 and a part of the hole wall of the through hole 11, a gap 4 corresponding to a zero-match area disappears, and an air flow can flow along the groove 222 to a gap 4 corresponding to a peripheral area of the zero-match area, so as to pass through the gap 4.

In this implementation, when the groove 222 is disposed in the circumferential direction of the decorating ring 22, the groove 222 can cooperate with the channel 5 to better avoid air flow blocking caused by blocking some areas of the gap 4. This ensures that the housing assembly 10 can still rapidly balance the internal and external air pressure when the assembly precision is insufficient.

Referring to FIG. 5, the decorating ring 22 further has a stiffener 223, and the stiffener 223 is disposed in the groove 222. The stiffener 223 can increase structural strength of the decorating ring 22 and reduce a deformation risk of the decorating ring 22. An extension direction of the stiffener 223 may be approximately perpendicular to the substrate 21. When the decorating ring 22 is at least partially accommodated in the through hole 11 (shown in FIG. 6), the extension direction of the stiffener 223 is approximately parallel to an axial direction of the through hole 11, and the stiffener 223 can assist the decorating ring 22 in better supporting a pressing force that is approximately perpendicular to the housing 1.

An outer surface of the stiffener 223 is a smooth surface. For example, the outer surface of the stiffener 223 may be an arc surface, or may include a plane in the middle and a transition are plane connected to both ends of the plane. In this case, an air flow encounters relatively small resistance when passing through the stiffener 223. This helps improve the air exchange rate between the inner and outer sides of the housing assembly 10.

Figure 10:
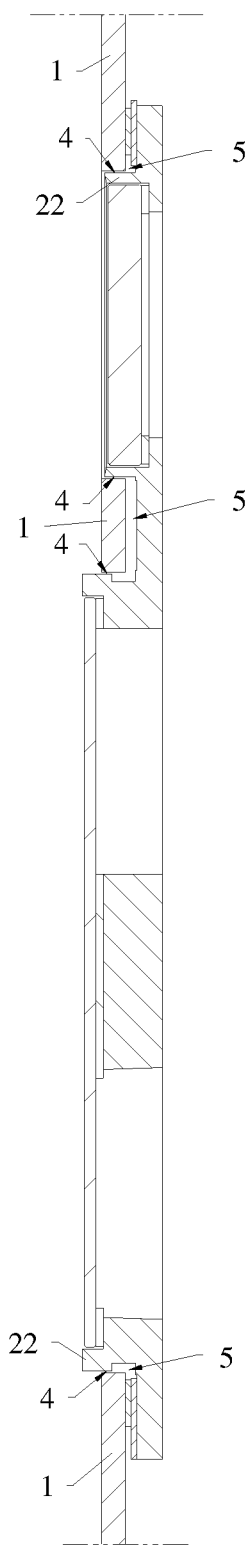
FIG. 10 is a schematic diagram of a structure along a line D-D of the terminal shown in FIG. 1.

FIG. 10 is a schematic diagram of a structure along a line D-D of the terminal shown in FIG. 1. There are two decorating rings 22, and two through holes 11. A gap 4 formed between each decorating ring 22 and a hole wall of a through hole of the housing 1 communicates with the channel 5.

In this implementation, because the channel 5 communicates with the gaps 4 corresponding to all the decorating rings 22 (at least two), an air flow can enter into and exit from the housing 1 through at least one of the gaps 4 corresponding to all the decorating rings 22. The channel 5 has at least two gaps 4 communicating with the outside of the terminal 100, and the housing assembly 10 forms a multi-path air exchange system, thereby improving the air exchange rate between the inner and outer sides of the housing assembly 10, and enabling the housing assembly 10 to rapidly balance the internal and external air pressure.

In addition, because the channel 5 has at least two gaps 4, and the at least two gaps 4 may be used as water discharge openings, sealing malfunction due to long-term water storage in the channel 5 can be prevented.

Figure 11:
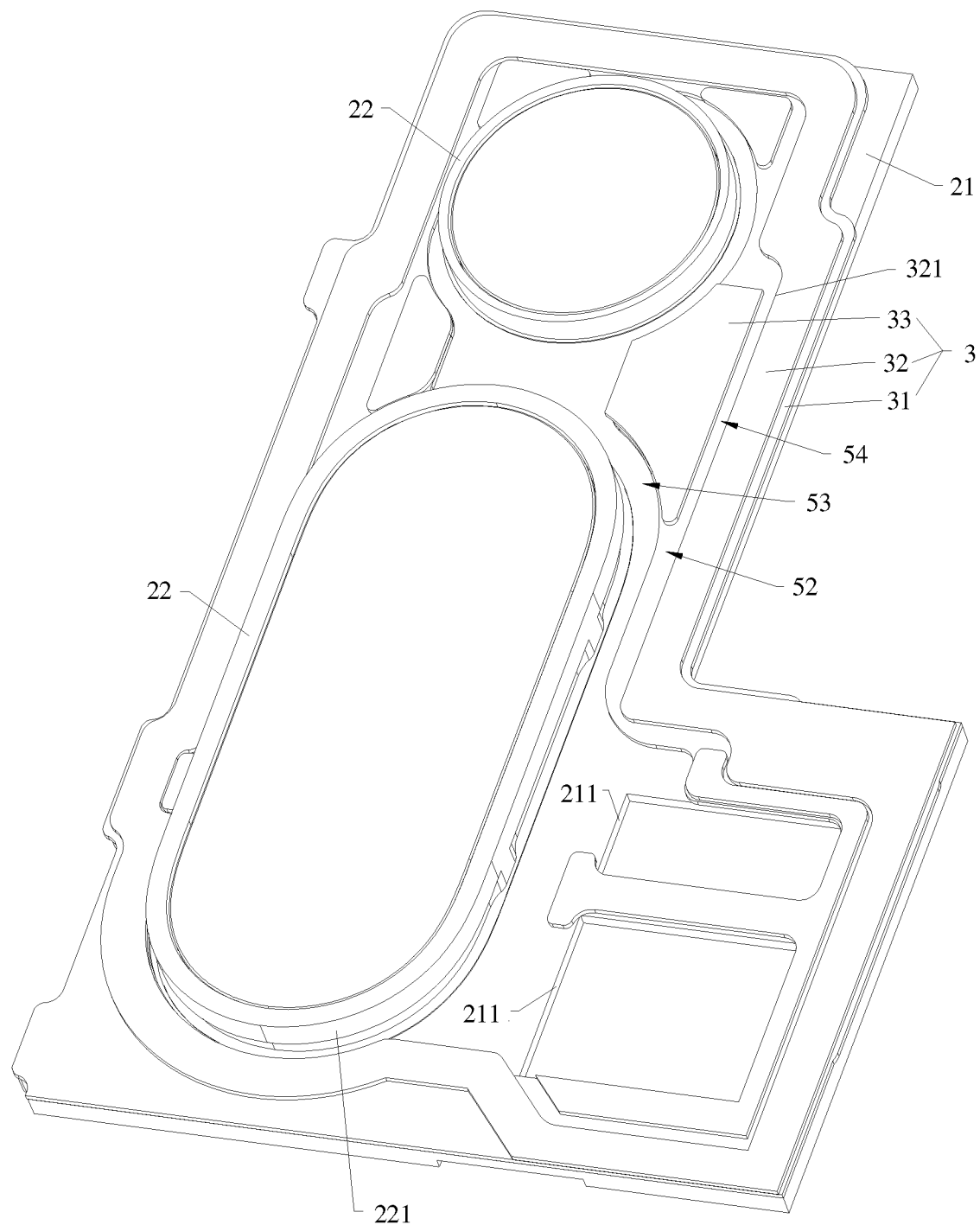
FIG. 11 is a schematic structural diagram of a partial structure of a housing assembly shown in FIG. 2 in another implementation.
Figure 12:
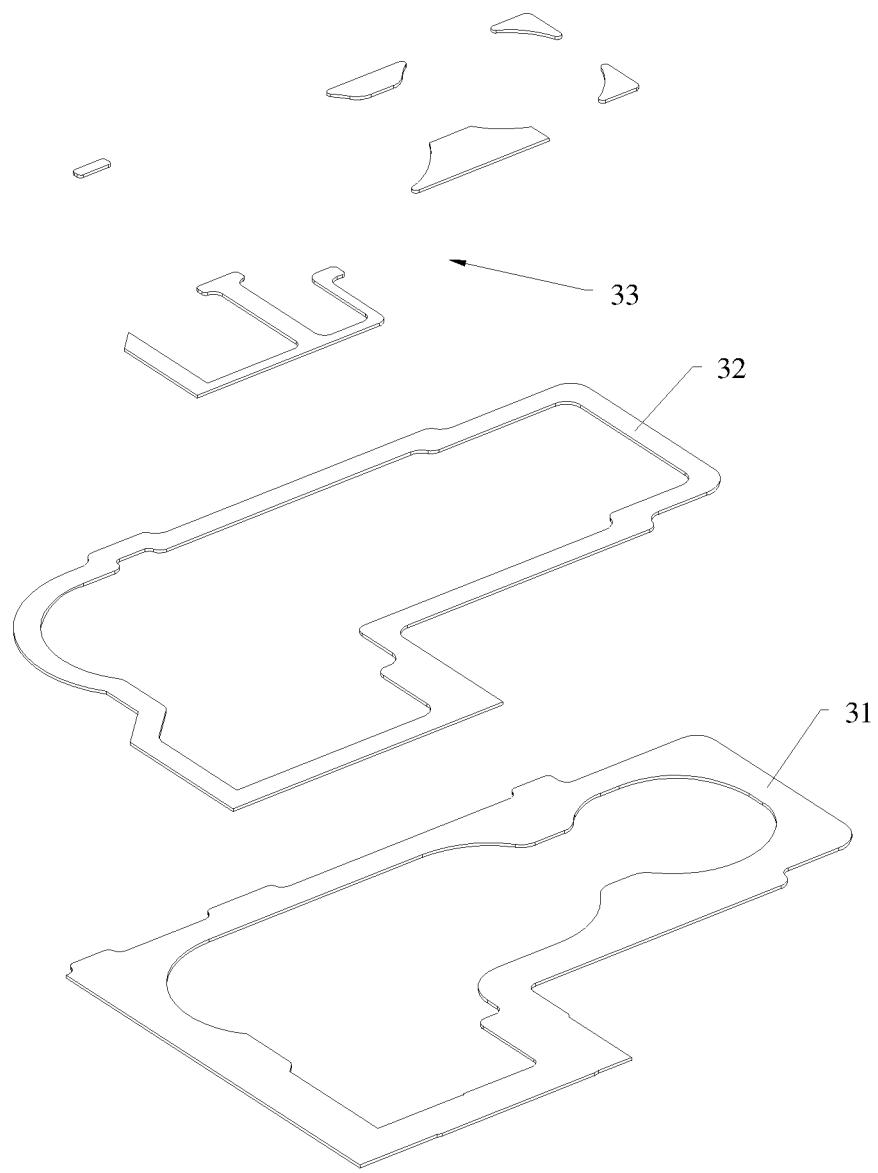
FIG. 12 is a schematic exploded view of an adhesive assembly shown in FIG. 11.

In an implementation, FIG. 11 is a schematic structural diagram of a partial structure of a housing assembly shown in FIG. 2 in another implementation. FIG. 12 is a schematic exploded view of an adhesive assembly shown in FIG. 11.

A difference between the housing assembly in this implementation and those in the foregoing implementations lies in the following: The adhesive assembly 3 further includes a soft support part 33. There are a plurality of soft support parts 33. Shapes of the plurality of soft support parts 33 may be the same or different. There may be a single soft support part 33 in another implementation. The soft support part 33 is disposed in the second gap 52. The soft support part 33 is fastened to the first adhesive layer 31. The soft support part 33 is disposed on a same layer as the second adhesive layer 32. The adhesive assembly 3 forms a sandwiched structure, and includes a stacking structure with two layers. One layer is the first adhesive layer 31. On the other layer, the second adhesive layer 32 serves as a periphery, and the soft support part 33 is in the middle. Disposing the soft support part 33 makes the sandwiched structure have relatively high overall support strength. When a force is applied to the housing 1 (shown in FIG. 2) or the substrate 21, the adhesive assembly 3 can play good buffer and support functions.

Figure 13:
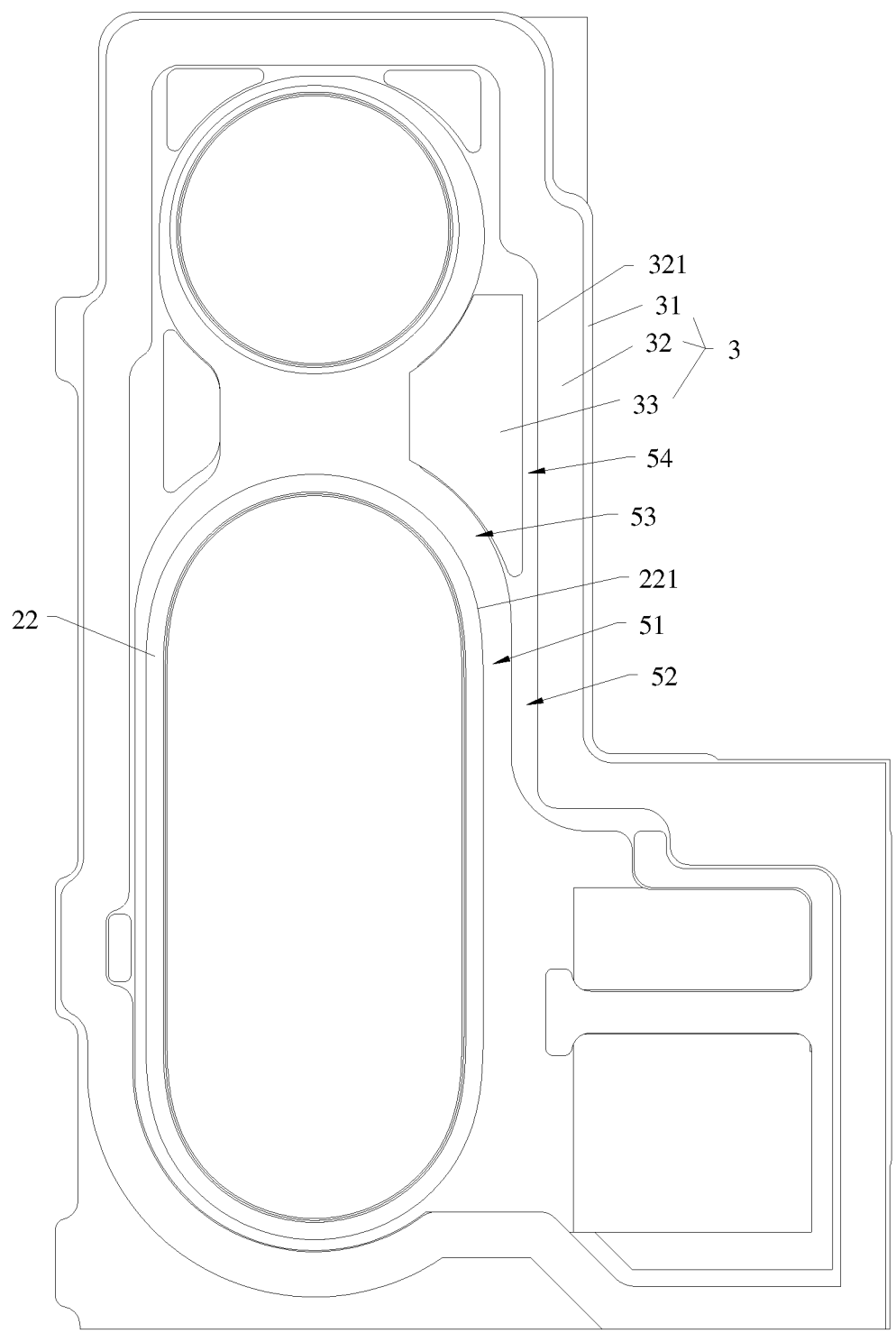
FIG. 13 is a top view of the structure shown in FIG. 11.

FIG. 13 is a top view of the structure shown in FIG. 11. A third gap 53 is formed between the soft support part 33 and the outer peripheral side surface 221 of the decorating ring 22. A projection of the third gap 53 on the substrate 21 covers a projection of the first gap 51 on the substrate 21. A fourth gap 54 is formed between the soft support part 33 and the inner peripheral side surface 321 of the second adhesive layer 32. Both the fourth gap 54 and the third gap 53 are parts of the second gap 52 and communicate with each other. In this case, the soft support part 33 can provide a support function. In addition, the third gap 53 between the soft support part 33 and the outer peripheral side surface 221 of the decorating ring 22 and the fourth gap 54 between the soft support part 33 and the inner peripheral side surface 321 of the second adhesive layer 32 are parts of the channel 5. In this way, the channel 5 has a sufficient circulation area, to ensure that the housing assembly 10 can rapidly balance the internal and external pressure.

The plurality of soft support parts 33 are arranged in the second gap 52 in a scattered manner. Replacing a conventional surface-based support manner of the second adhesive layer 32 with a point-based support manner of the soft support part 33 enables a relatively large circulation area of the second gap 52. The soft support parts 33 are mainly arranged at positions with relatively large widths in the second gap 52, so that the adhesive assembly 3 implements a more comprehensive and balanced support function.

A thickness of the soft support part 33 is the same as a thickness of the second adhesive layer 32, so that the adhesive assembly 3 implements a more stable support function.

The first adhesive layer 31 and the second adhesive layer 32 may use a double-sided adhesive film structure. The soft support part 33 may not be provided with an adhesive film, to reduce material costs. Alternatively, in another implementation, the soft support part 33 may use a single-sided or double-sided adhesive film structure.

Figure 14:
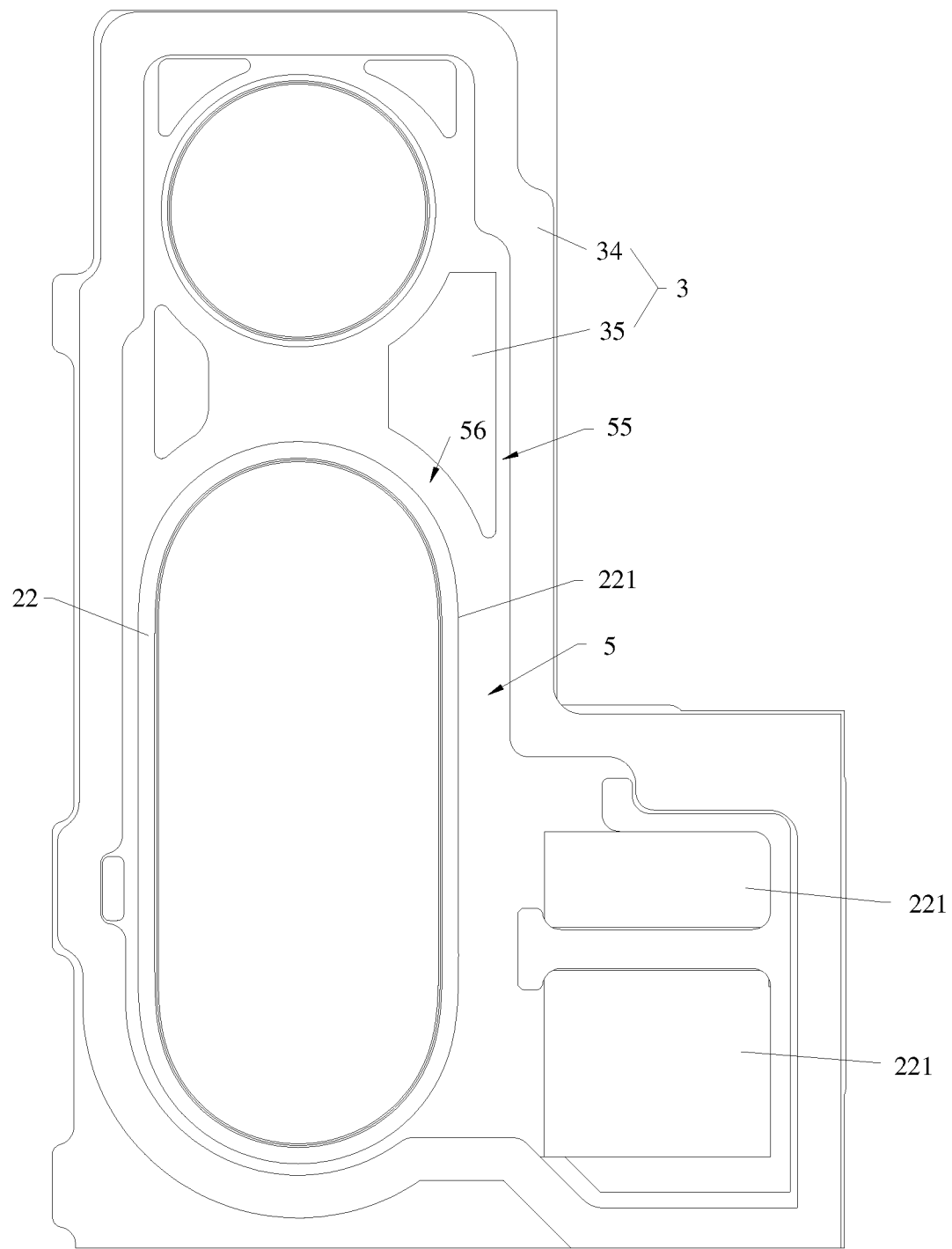
FIG. 14 is a top view of a partial structure of a housing assembly shown in FIG. 2 in still another implementation.

In an implementation, FIG. 14 is a top view of a partial structure of a housing assembly shown in FIG. 2 in still another implementation. A difference between the housing assembly in this implementation and those in the foregoing implementations lies in the following: The adhesive assembly 3 includes an integrally formed adhesive ring 34. The adhesive ring 34 is disposed around the decorating ring 22 and the air hole 211. In this implementation, the adhesive assembly 3 is provided with the integrally formed adhesive ring 34 instead of using a multi-layer stacking structure. This simplifies a structure of the adhesive assembly 3, making the housing assembly 10 have relatively low costs and a relatively simple assembly process.

The adhesive assembly 3 further includes a soft support block 35. The soft support block 35 is disposed between the adhesive ring 34 and the decorating ring 22. A fifth gap 55 is formed between the soft support block 35 and the adhesive ring 34. A sixth gap 56 is formed between the soft support part 33 and the outer peripheral side surface 221 of the decorating ring 22. Both the fifth gap 55 and the sixth gap 56 are parts of the channel 5.

In this implementation, a gap between the adhesive ring 34 and the outer peripheral side surface 221 of the decorating ring 22 has a relatively large width, so that circulation space of the channel 5 is relatively large. The adhesive assembly 3 has the soft support block 35 disposed in the gap. In this way, the adhesive assembly 3 can have relatively reliable support performance. In addition, the fifth gap 55 and the sixth gap 56 enable relatively large circulation space of the channel 5, to meet the air flow circulation requirement of the housing assembly 10.

Figure 15:
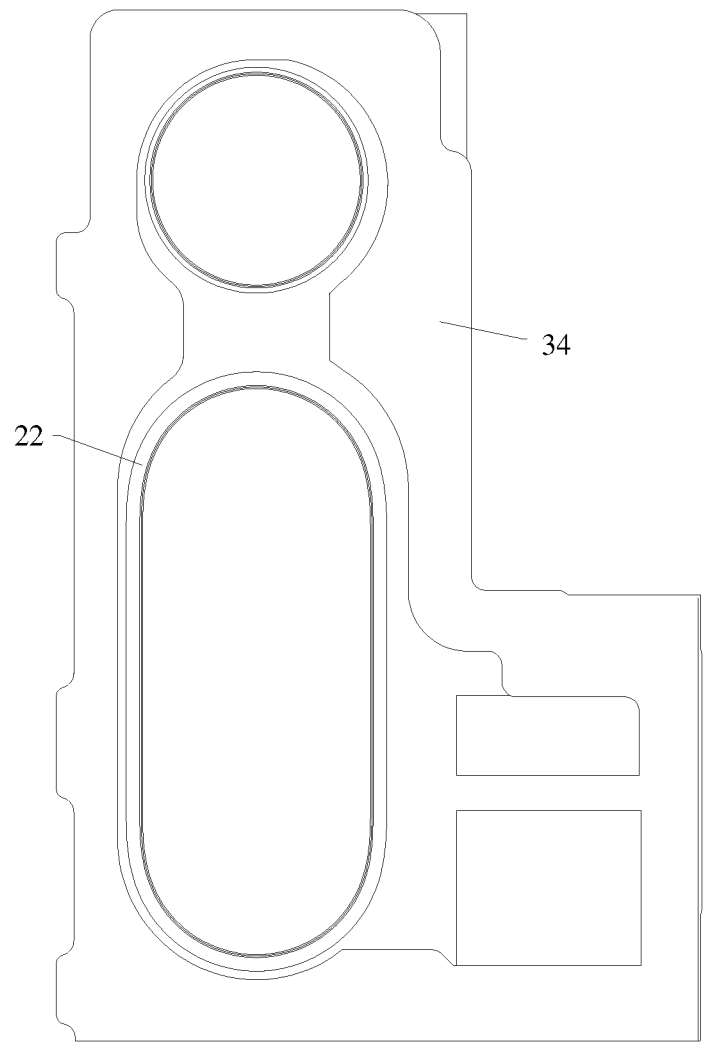
FIG. 15 is a top view of a partial structure of a housing assembly shown in FIG. 2 in yet another implementation.

Certainly, in another implementation, FIG. 15 is a top view of a partial structure of a housing assembly shown in FIG. 2 in yet another implementation. The adhesive assembly 3 may not be provided with the soft support block 35, and an inner peripheral side surface of the adhesive ring 34 is disposed close to the decorating ring 22, thereby meeting a support performance requirement of the adhesive assembly 3.

Figure 16:
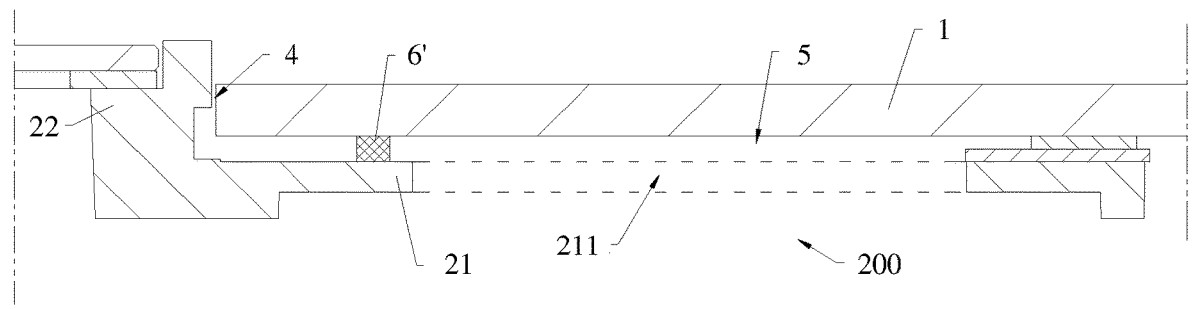
FIG. 16 is a local schematic structural diagram of a structure along a line A-A of the terminal shown in FIG. 1 in another implementation.

In an implementation, FIG. 16 is a local schematic structural diagram of a structure along a line A-A of the terminal shown in FIG. 1 in another implementation. A position of the structure shown in FIG. 16 corresponds to a position of the structure at B in FIG. 6.

A difference between the housing assembly in this implementation and those in the foregoing implementations lies in the following: The housing assembly 10 may include a spacer 6'. The housing assembly 10 is not provided with the waterproof breathable film 6 (shown in FIG. 6). The spacer 6' uses a waterproof breathable material to allow a gas to pass through and block a liquid. The spacer 6' is disposed in the channel 5 and located between the decorating ring 22 and the air hole 211, and separates the channel 5. The spacer 6' connects the substrate 21 to the housing 1. A gas flows in the following path: the outside of the terminal 100, the gap 4, the channel 5, the spacer 6', the air hole 211, and the overall inner cavity 200. A liquid is blocked by the waterproof breathable film 6, and flows in the following path: the outside of the terminal 100, the gap 4, the channel 5, and the spacer 6'.

It can be understood that, in this application, referring to FIG. 6 and FIG. 16, the housing assembly 10 is provided with the waterproof breathable film 6 or the spacer 6', so that the terminal 100 can meet a specific waterproof level (for example, IPX7 or higher), and can rapidly balance the internal and external air pressure, for the audio part in the overall inner cavity 200 to work properly.

In this application, a waterproof level of the waterproof breathable film 6 or the spacer 6' may be adjusted to meet a waterproof requirement of the terminal 100.

Figure 17:
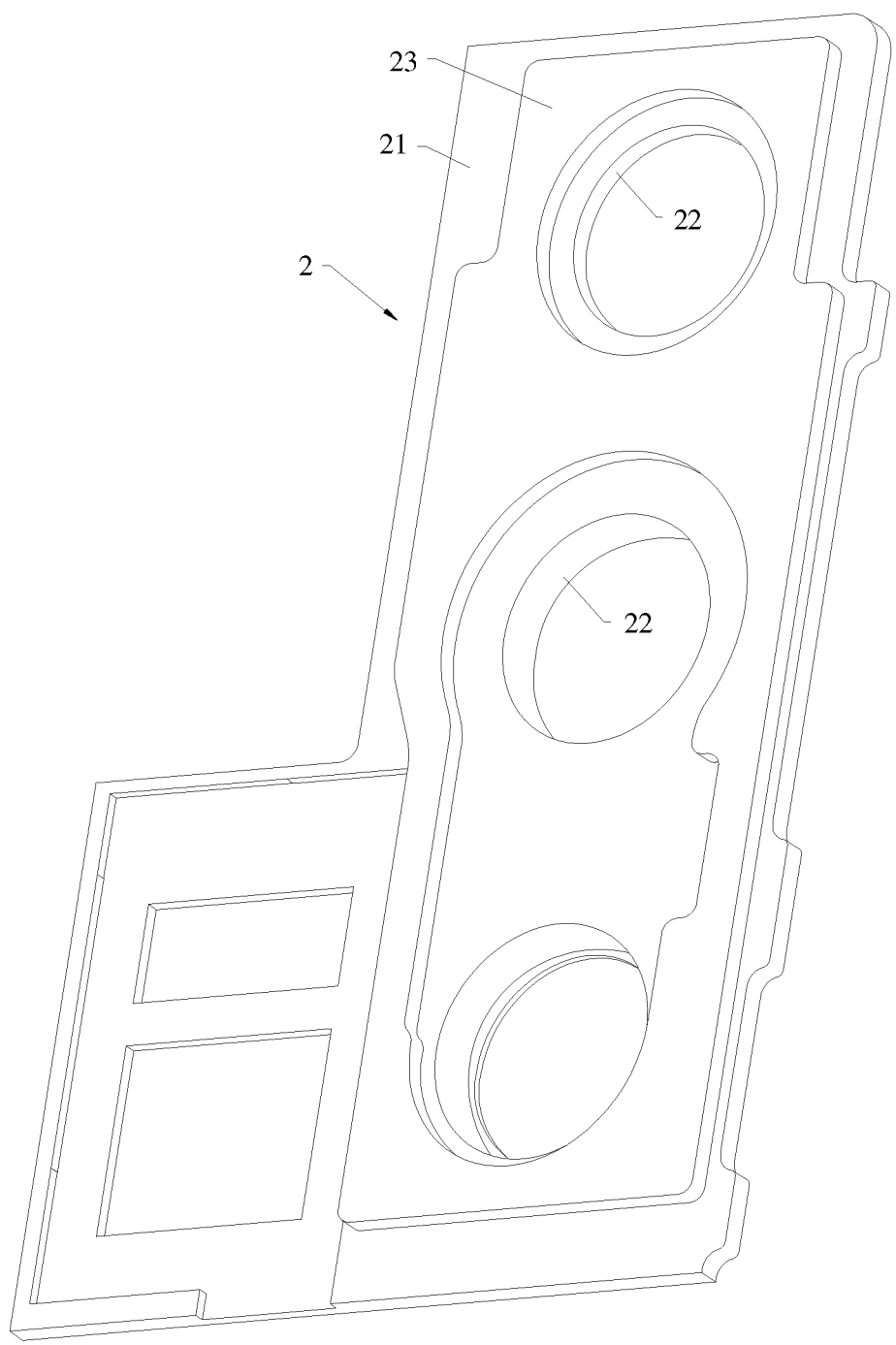
FIG. 17 is a schematic structural diagram of a decorating part of a housing assembly shown in FIG. 2 in an implementation.

In an implementation, FIG. 17 is a schematic structural diagram of a decorating part of a housing assembly shown in FIG. 2 in an implementation. A difference between the housing assembly in this implementation and those in the foregoing implementations lies in the following: The decorating part 2 further includes a stiffening plate 23. The stiffening plate 23 is fastened to a side, of the substrate 21, that faces away from the decorating ring 22. The stiffening plate 23 is configured to increase structural strength of the decorating part 2.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A housing assembly, comprising:
a housing, a through hole extending through the housing;
a decorating part, comprising a substrate and a decorating ring protruding from the substrate; and
an adhesive assembly; and
wherein an air hole extends through the substrate next to the decorating ring, the decorating ring is at least partially accommodated in the through hole, a first gap is between an outer peripheral side surface of the decorating ring and a sidewall of the through hole, the adhesive assembly seals the substrate to the housing, the adhesive assembly extends around the decorating ring and the air hole, a channel is formed between the adhesive assembly and the outer peripheral side surface of the decorating ring, and the channel communicates with the first gap and the air hole.

2. The housing assembly according to claim 1, wherein the channel continuously surrounds an outer periphery of the decorating ring.

3. The housing assembly according to claim 2, wherein the adhesive assembly comprises a first adhesive layer and a second adhesive layer, the first adhesive layer is attached to the substrate, the first adhesive layer extends around the decorating ring and the air hole, a second gap is between the first adhesive layer and the outer peripheral side surface of the decorating ring, the second adhesive layer is attached to the first adhesive layer and the housing, a third gap is between the second adhesive layer and the outer peripheral side surface of the decorating ring, and both the second gap and the third gap are comprised in the channel.

4. The housing assembly according to claim 3, wherein the adhesive assembly further comprises a soft support part, the soft support part is disposed in the third gap, a fourth gap is between the soft support part and the outer peripheral side surface of the decorating ring, a fifth gap is between the soft support part and an inner peripheral side surface of the second adhesive layer, and both the fourth gap and the fifth gap are comprised in the third gap and communicate with each other.

5. The housing assembly according to claim 4, wherein a thickness of the soft support part is the same as a thickness of the second adhesive layer.

6. The housing assembly according to claim 2, wherein the adhesive assembly comprises an integral adhesive ring, and the adhesive ring extends around the decorating ring and the air hole.

7. The housing assembly according to claim 6, wherein the adhesive assembly further comprises a soft support block, the soft support block is disposed between the adhesive ring and the decorating ring, a sixth gap is formed between the soft support block and the adhesive ring, a seventh gap is formed between the soft support block and the outer peripheral side surface of the decorating ring, and both the seventh gap and the sixth gap are comprised in the channel.

8. The housing assembly according claim 2, wherein a groove is disposed in the decorating ring, the groove is disposed in a circumferential direction of the decorating ring, the groove is recessed from the outer peripheral side surface of the decorating ring towards an interior of the decorating ring, and the groove communicates with the gap and the channel.

9. The housing assembly according to claim 8, wherein the decorating ring further comprises a stiffener disposed in the groove.

10. The housing assembly according to claim 1, wherein the housing assembly further comprises a waterproof breathable film, at least two air holes extend through the substrate, and the waterproof breathable film covers the at least two air holes.

11. The housing assembly according to claim 1, wherein the decorating part comprises at least two decorating rings, and a gap is between each of the at least two decorating rings and the sidewall of the through hole.

12. A terminal, comprising:
an audio part; and
a housing assembly, comprising:
  a housing, a through hole extending through the housing, wherein the audio part is located on an inner side of the housing;
  a decorating part, comprising a substrate and a decorating ring protruding from the substrate; and
  an adhesive assembly; and
wherein an air hole extends through the substrate next to the decorating ring, the decorating ring is at least partially accommodated in the through hole, a first gap is between an outer peripheral side surface of the decorating ring and a sidewall of the through hole, the adhesive assembly seals the substrate to the housing, the adhesive assembly extends around the decorating ring and the air hole, a channel is formed between the adhesive assembly and the outer peripheral side surface of the decorating ring, the channel communicates with the first gap and the air hole, and a rear cavity of the audio part communicates with the air hole.

13. The terminal according to claim 12, wherein the channel continuously surrounds an outer periphery of the decorating ring.

14. The terminal according to claim 13, wherein the adhesive assembly comprises a first adhesive layer and a second adhesive layer, the first adhesive layer is attached to the substrate, the first adhesive layer extends around the decorating ring and the air hole, a second gap is between the first adhesive layer and the outer peripheral side surface of the decorating ring, the second adhesive layer is attached to the first adhesive layer and the housing, a third gap is between the second adhesive layer and the outer peripheral side surface of the decorating ring, and both the second gap and the third gap are comprised in the channel.

15. The terminal according to claim 14, wherein the adhesive assembly further comprises a soft support part, the soft support part is disposed in the third gap, a fourth gap is between the soft support part and the outer peripheral side surface of the decorating ring, a fifth gap is between the soft support part and an inner peripheral side surface of the second adhesive layer, and both the fourth gap and the fifth gap are comprised in the third gap and communicate with each other.

16. The terminal according to claim 15, wherein a thickness of the soft support part is the same as a thickness of the second adhesive layer.

17. The terminal according to claim 12, wherein the adhesive assembly comprises an integral adhesive ring, and the adhesive ring extends around the decorating ring and the air hole.

18. The terminal according to claim 17, wherein the adhesive assembly further comprises a soft support block, the soft support block is disposed between the adhesive ring and the decorating ring, a sixth gap is formed between the soft support block and the adhesive ring, a seventh gap is formed between the soft support block and the outer peripheral side surface of the decorating ring, and both the seventh gap and the sixth gap are comprised in the channel.

19. The terminal according claim 12, wherein a groove is disposed in the decorating ring, the groove is disposed in a circumferential direction of the decorating ring, the groove is recessed from the outer peripheral side surface of the decorating ring towards an interior of the decorating ring, and the groove communicates with the gap and the channel.

20. The terminal according to claim 19, wherein the decorating ring further comprises a stiffener disposed in the groove.

* * * * *